United States Patent
Kim

(10) Patent No.: US 9,462,176 B2
(45) Date of Patent: Oct. 4, 2016

(54) ELECTRONIC APPARATUS FOR FASTENING AN INTERCHANGEABLE LENS AND AN EXTERNAL SPEAKER AND CONTROL METHOD THEREOF

(71) Applicant: SAMSUNG ELECTRONICS CO., LTD., Suwon-si, Gyeonggi-do (KR)

(72) Inventor: Hyung-dal Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 33 days.

(21) Appl. No.: 14/251,954

(22) Filed: Apr. 14, 2014

(65) Prior Publication Data

US 2015/0146083 A1 May 28, 2015

(30) Foreign Application Priority Data

Nov. 25, 2013 (KR) ........................ 10-2013-0143762

(51) Int. Cl.
*H04N 5/232* (2006.01)
*H04N 5/225* (2006.01)
*H04R 1/02* (2006.01)
*H04R 3/12* (2006.01)

(52) U.S. Cl.
CPC ........ *H04N 5/23209* (2013.01); *H04N 5/2251* (2013.01); *H04N 5/2254* (2013.01); *H04R 1/028* (2013.01); *H04R 1/025* (2013.01); *H04R 3/12* (2013.01); *H04R 2499/11* (2013.01)

(58) Field of Classification Search
CPC .......... H04N 5/23209; H04N 5/2254; H04R 29/00; H04R 5/04
USPC ............. 348/360, 375, 374, 376; 381/58, 59
See application file for complete search history.

(56) References Cited

U.S. PATENT DOCUMENTS

| 2004/0196985 | A1* | 10/2004 | Kokubo ........................ 381/79 |
| 2006/0269075 | A1* | 11/2006 | Takakusaki ..................... 381/59 |
| 2007/0152799 | A1* | 7/2007 | McDonough ........... G04F 1/005 340/309.16 |
| 2007/0201705 | A1* | 8/2007 | Dorogusker et al. ......... 381/104 |
| 2012/0147181 | A1* | 6/2012 | Duner .................... G03B 17/02 348/143 |

FOREIGN PATENT DOCUMENTS

JP 2004088717 * 3/2004 ............. H04N 5/225

* cited by examiner

*Primary Examiner* — Nhan T Tran
(74) *Attorney, Agent, or Firm* — Drinker Biddle & Reath LLP

(57) ABSTRACT

An electronic apparatus includes a mount unit configured to fasten one of an interchangeable lens and an external speaker, and a controller configured to control lens driving of the interchangeable lens when the interchangeable lens is fastened to the mount unit and control audio output of the external speaker when the external speaker is fastened to the mount unit.

17 Claims, 11 Drawing Sheets

ELECTRONIC APPARATUS FOR FASTENING AN INTERCHANGEABLE LENS AND AN EXTERNAL SPEAKER AND CONTROL METHOD THEREOF

CROSS-REFERENCE TO RELATED APPLICATION

This application claims the priority benefit of Korean Patent Application No. 10-2013-0143762, filed on Nov. 25, 2013, in the Korean Intellectual Property Office, the disclosure of which is incorporated herein by reference in its entirety.

BACKGROUND

1. Field

Apparatuses and methods consistent with exemplary embodiments relate to an electronic apparatus and a control method thereof, and more particularly, to an electronic apparatus having an imaging function, the electronic apparatus being capable of fastening an interchangeable lens, and a control method thereof.

2. Description of the Related Art

In general, imaging apparatuses capable of fastening an interchangeable lens fasten the interchangeable lens through a lens mount formed in one region of a body of the imaging apparatus, perform interface communication with the fastened interchangeable lens, and perform data communication for lens driving.

When the interchangeable lens is not fastened on the lens mount in the imaging apparatus, a body cap is fastened to the mount to protect an imaging device such as a charge coupled device (CCD) image sensor or a complementary metal oxide semiconductor (CMOS) image sensor in the image apparatus.

That is, the imaging apparatuses in the related art only perform data communication with the interchangeable lens fastened to the lens mounts through interface units formed on the lens mounts configured to fasten the interchangeable lenses, and do not fasten to and perform data communication with other electronic devices.

SUMMARY

One or more exemplary embodiments may overcome the above disadvantages and other disadvantages not described above. However, it is understood that one or more exemplary embodiments are not required to overcome the disadvantages described above, and may not overcome any of the problems described above.

One or more exemplary embodiments fasten an interchangeable lens as well as another electronic device through a lens mount and perform another function in an electronic apparatus.

According to an exemplary embodiment, an electronic apparatus includes: a mount unit configured to fasten at least one accessory selected from the group consisting of an interchangeable lens and an external speaker; and a controller configured to control lens driving of the interchangeable lens when the interchangeable lens is fastened to the mount unit, and control audio output of the external speaker when the external speaker is fastened to the mount unit.

The mount unit may include a first interface unit configured to perform communication with the interchangeable lens and the external speaker. The controller may determine whether the interchangeable lens or the external speaker is fastened to the mount unit based on identification information received through the first interface unit.

The controller may control initialization setting for performing communication with the external speaker, and supply power to the external speaker when the external speaker is fastened to the mount unit.

The electronic apparatus may further include a display unit. The controller may control the display unit to display a user interface (UI) screen configured to control the audio output of the external speaker when the external speaker is fastened to the mount unit.

The controller may transmit an audio signal related to a user command or a control signal for the audio signal to the external speaker through the first interface unit when the user command for the audio output of the external speaker is input based on the UI screen.

The electronic apparatus may further include an internal speaker. The controller may control transmission of the first interface unit and audio output of the internal speaker so that an audio signal related to a user command is output from the external speaker and the internal speaker when the user command for controlling multi audio output is input based on the UI screen.

The electronic apparatus may further include an internal speaker. The controller may interrupt audio output of the internal speaker, and transmit an audio signal through the first interface unit so that the audio signal is output from the external speaker when the external speaker is fastened to the mount unit in a state in which the audio signal is output through the internal speaker.

The controller may interrupt transmission of the audio signal to the external speaker, and control the audio signal to be output through the internal speaker when the external speaker fastened to the mount unit is detached in a state in which the audio signal is output through the external speaker.

The external speaker may include a fastening unit configured to fasten to the mount unit and include a second interface unit configured to perform communication with the electronic apparatus, an audio output unit configured to output an audio signal through at least two audio channels, and a controller configured to adjust output of a received audio signal based on preset output information when the audio signal is received from the electronic apparatus through the second interface unit, and control the audio output unit to adjust the output of the audio signal based on a received control signal and to output the adjusted audio signal when the control signal for the audio signal is received.

The electronic apparatus may further include an input unit configured to receive an adjustment command for audio output through a jog dial or an operation button. The controller may control the audio output unit to adjust the output of the audio signal according to the adjustment command input through the input unit, and to output the adjusted audio signal.

According to an exemplary embodiment, a method of controlling an electronic apparatus includes: detecting fastening of a mount unit; controlling lens driving of an interchangeable lens when the interchangeable lens is fastened to the mount unit; and controlling audio output of an external speaker when the external speaker is fastened to the mount unit.

The detecting may include detecting whether the interchangeable lens or the external speaker is fastened to the mount unit through identification information received through a first interface unit of the mount unit.

The controlling audio output may include controlling initialization setting for performing communication with the external speaker, and supplying power to the external speaker when the external speaker is fastened to the mount unit.

The controlling audio output may further include displaying a user interface (UI) screen configured to control the audio output of the external speaker when the external speaker is fastened to the mount unit.

The controlling may further include transmitting an audio signal related to a user command or a control signal for the audio signal to the external speaker through the first interface unit when the user command for the audio output of the external speaker is input based on the UI screen.

The controlling audio output may further include controlling transmission of the first interface unit and audio output of an internal speaker so that an audio signal related to a user command is output from the external speaker and the internal speaker when the user command for controlling multi audio output is input based on the UI screen.

The controlling audio output may further include interrupting audio output of the internal speaker and transmitting an audio signal through the first interface unit so that the audio signal is output from the external speaker when the external speaker is fastened to the mount unit in a state in which the audio signal is output through the internal speaker.

The controlling audio output may further include interrupting transmission of the audio signal to the external speaker and controlling the audio signal to be output through the internal speaker when the external speaker fastened to the mount unit is detached in a state in which the audio signal is output through the external speaker.

The external speaker may transmit the identification information to the electronic apparatus when the external speaker is fastened to the mount unit, adjust output of a received audio signal based on preset output information and output the adjusted audio signal through at least two audio channels when the audio signal is received from the electronic apparatus, and adjust the output of the audio signal based on a received control signal, and output the adjusted audio signal when the control signal for the audio signal is received.

The external speaker may adjust the output of the audio signal according to an input adjustment command, and output the adjusted audio signal when the adjustment command for the audio output is input through a jog dial or an operation button.

According to the above-described various exemplary embodiments, an electronic apparatus may fasten various electronic devices through a lens mount configured to fasten an interchangeable lens and control the various electronic devices to expand an existing function and perform a new function.

Additional aspects and advantages of the exemplary embodiments will be set forth in the detailed description, will be apparent from the detailed description, or may be learned by practicing the exemplary embodiments.

BRIEF DESCRIPTION OF THE DRAWINGS

The above and/or other aspects will be more apparent by describing in detail exemplary embodiments, with reference to the accompanying drawings, in which.

DETAILED DESCRIPTION

Figure 1:
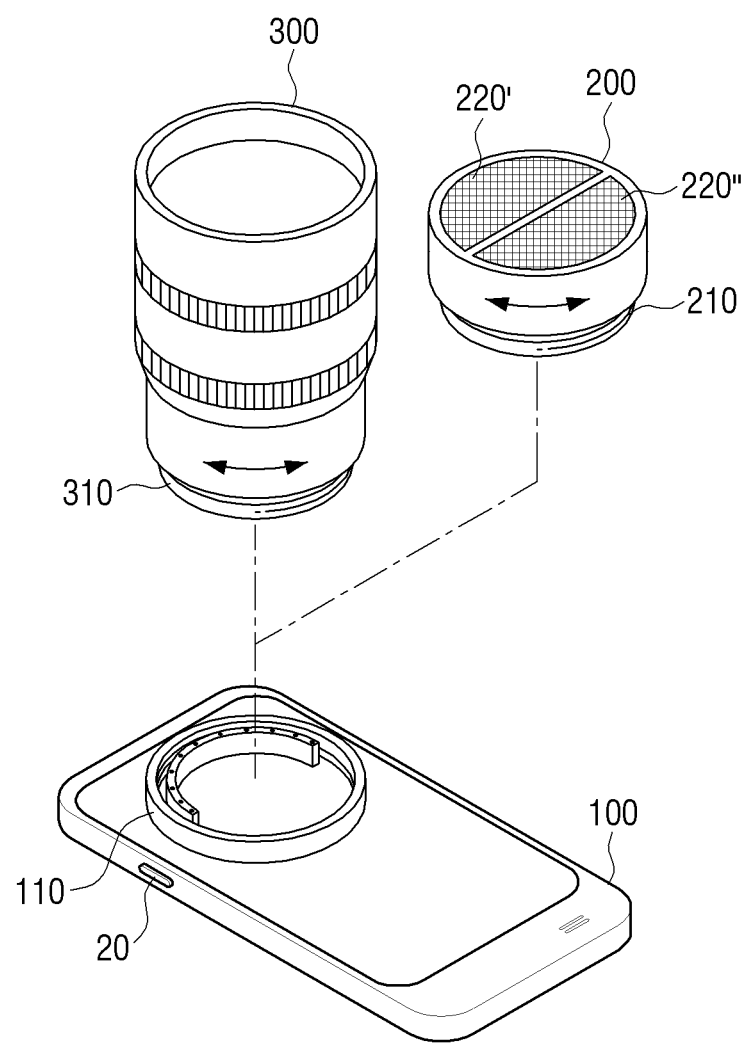
FIG. 1 is an illustrative view illustrating an electronic apparatus according to an exemplary embodiment.

Hereinafter, exemplary embodiments will be described in more detail with reference to the accompanying drawings.

In the following description, the same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is an illustrative view illustrating an electronic apparatus according to an exemplary embodiment.

As illustrated in FIG. 1, an electronic apparatus 100 may be a terminal apparatus configured to photograph an image such as a smart phone or a smart camera, specifically, a terminal apparatus configured to photograph an image through an interchangeable lens 300.

The electronic apparatus 100 may display an image and be fastened to the interchangeable lens 300 through a mount unit 110 provided to a rear surface of a display panel to which a touch command of a user is input. The interchangeable lens 300 may be a lens mountable on and detachable from the electronic apparatus such as a digital single-lens reflex (DSLR) camera, and include a lens fastening unit 310 that fastens to the mount unit 110 of the electronic apparatus 100 on a bottom surface thereof. Therefore, the electronic apparatus 100 and the interchangeable lens 300 may be fastened through fastening between the mount unit 110 and the lens fastening unit 310. The mount unit 110 may include a kind of camera opening structurally configured in such a way that the interchangeable lens 300 is inserted into a body of the electronic apparatus 100. In general, the mount unit 110 may be implemented with one of a screw type C mount configured to rotate the interchangeable lens 300 to one direction and fasten the interchangeable lens 300 to the body of the electronic apparatus 100, and an A mount configured to put the interchangeable lens 300 in a bayonet type mount in the body of the electronic apparatus 100 and fasten the interchangeable lens 300 to the body of the electronic apparatus 100.

When an optical signal for a subject is incident from the interchangeable lens 300 fastened through the mount unit 110, the electronic apparatus 100 converts the optical signal for the subject incident through the interchangeable lens 300 into an electrical signal using an imaging device such as a CCD image sensor or a CMOS image sensor. Then, the electronic apparatus 100 may generate a video image from a video signal signal-processed from the electrical signal and display the video image through a display panel. When an operation command of a key button 20 provided in one lateral surface of the electronic apparatus 100 is input from a user in a state in which the video image is displayed through the display panel, the electronic apparatus 100 may perform imaging on the currently displayed video image.

As illustrated in FIG. 1, the electronic apparatus 100 may fasten an external speaker 200 through the mount unit 110. When the external speaker 200 is fastened through the mount unit 110, the electronic apparatus 100 may output an audio signal through the external speaker 200.

Specifically, the external speaker 200 may include a fastening unit 210 configured to be fastened to the mount unit 110 in the bottom surface thereof. The fastening unit 210 may be implemented in the same shape as the lens fastening unit 310 of the interchangeable lens 300. Therefore, the electronic apparatus 100 may perform fastening of the interchangeable lens 300 and the external speaker 200 through the mount unit 110, and output an audio signal through the external speaker 200.

More specifically, when the electronic apparatus 100 is fastened to the fastening unit 210 of the external speaker 200 through the mount unit 110, the connection between connection terminals formed in the mount unit 110 and the fastening unit 210 is obtained to start interface communication. When the interface communication with the electronic apparatus 100 starts, the external speaker 200 may transmit identification information of the external speaker 200 to the electronic apparatus 100, and thus the electronic apparatus 100 may determine whether or not the external speaker 200 is fastened to the mount unit 110.

When it is determined that the external speaker 200 is fastened to the mount unit 110, the electronic apparatus 100 may supply power to the external speaker 200 through the interface communication. Then, when an audio output command is input from the user, the electronic apparatus 100 transmits an audio signal corresponding to the input audio output command to the external speaker 200. At about the same time, the electronic apparatus 100 determines a channel in which the audio signal is to be output based on an audio channel of the external speaker 200, signal-processes the audio signal to an audio signal corresponding to the determined audio channel, and transmits the processed audio signal to the external speaker 200. Therefore, the external speaker 200 may output the audio signal through the corresponding audio channel.

When an operation command of the key button 20 provided in one lateral surface of the electronic apparatus 100 is input from the user in a state in which the audio signal is output through the external speaker 200, the electronic apparatus 100 transmits a control command for adjusting output of the audio signal currently output through the external speaker 200 to the external speaker 200. Thus, the external speaker 200 may adjust an output intensity of the audio signal based on the control signal received from the electronic apparatus 100 and output the adjusted audio signal.

Figure 2:
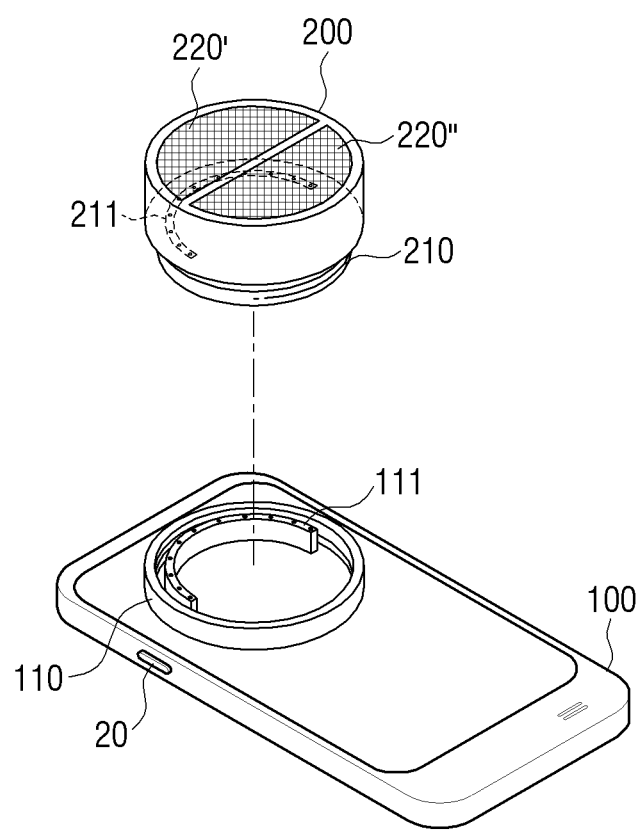
FIG. 2 is an illustrative view illustrating fastening of an external speaker to an electronic apparatus according to an exemplary embodiment.
Figure 3:
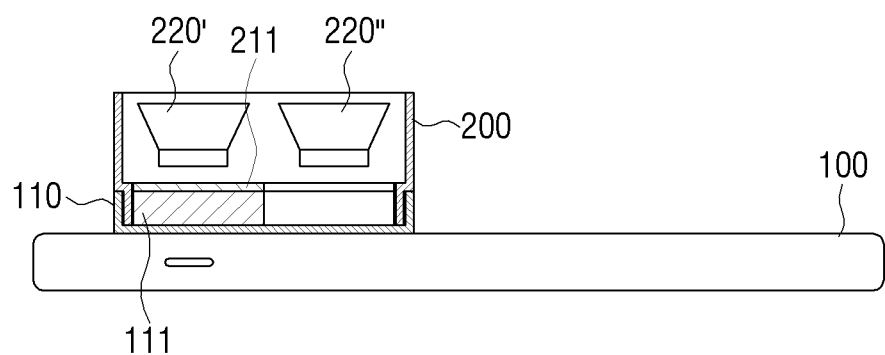
FIG. 3 is a cross-sectional view schematically illustrating fastening between an electronic apparatus and an external speaker according to an exemplary embodiment.

FIG. 2 is an illustrative view illustrating fastening of the external speaker 200 to the electronic apparatus 100 according to an exemplary embodiment, and FIG. 3 is a cross-sectional view schematically illustrating fastening between the electronic apparatus 100 and the external speaker 200 according to an exemplary embodiment.

As illustrated in FIG. 2, the mount unit 110 configured to fasten the interchangeable lens 300 and the external speaker 200 may be formed in the rear surface of the electronic apparatus 100. In embodiments, a screw thread may be disposed on an inner lateral surface of the mount unit 110, and screw threads configured to be coupled to the screw thread in the inner lateral surface of the mount unit 110 may be disposed on an outer circumferential surface of the lens fastening unit 310 of the interchangeable lens 300 and an outer circumferential surface of the fastening unit 210 of the external speaker 200.

Therefore, when the lens fastening unit 310 of the interchangeable lens 300 and the fastening unit 210 of the external speaker 200 are inserted into the mount unit 110 and rotated to one direction, the interchangeable lens 300 and the external speaker 200 may be fastened to the mount unit 110.

As illustrated in FIG. 2, a first interface unit 111 including a plurality of connection terminals configured to perform data communication with the interchangeable lens 300 and the external speaker 200 may be formed in an inner surface of the mount unit 110, and connection terminals configured to be connected to the connection terminals of the first interface unit 111 and perform data communication may be formed in inner surfaces of the interchangeable lens 300 and the external speaker 200. Therefore, when the interchangeable lens 300 and the external speaker 200 are fastened to the mount unit 110, connections between the connection terminals is obtained to perform data communication.

A detailed description of known technology for performing fastening between the mount unit 110 and the interchangeable lens 300 and data communication between the interchangeable lens 300 fastened through the mount unit 110 and the electronic apparatus 100, and displaying the video image for the subject incident through the interchangeable lens 300 on a screen will be omitted.

As described above, the external speaker 200 may include the fastening unit 210 configured to be fastened to the mount unit 110, and a second interface unit 211 including a plurality of connection terminals configured to perform data communication with the electronic apparatus 100 may be formed in an inner surface of the fastening unit 210.

Therefore, when the external speaker 200 is rotated to one direction and the screw thread disposed in the outer circumferential surface of the fastening unit 210 of the external speaker 200 is completely coupled to the screw thread disposed in the inner lateral surface of the mount unit 110, as illustrated in FIG. 3, connection between the connection terminals formed in the first and second interface units 111 and 211 may be obtained. The first and second interface units 111 and 211 may be formed to heights sufficient to be in contact with each other. The first and second interface units 111 and 211 may be formed to have the heights smaller than those of the mount unit 110 and the fastening unit 210. That is, the first and second interface units 111 and 211 may be formed to the heights so that the first and second interface units 111 and 211 are formed within the mount unit 110 and the fastening unit 210, and thus the first and second interface units 111 and 211 may be prevented from being exposed in an external environment.

When the connection between the connection terminals formed in the first and second interface units 111 and 211 is obtained, the electronic apparatus 100 may supply power to the external speaker 200, and perform data communication related to audio output between the electronic apparatus 100 and the external speaker 200.

The exemplary embodiment has described only that the screw thread disposed in the inner lateral surface of the mount unit 110 is coupled to the screw thread disposed in the outer circumferential surface of the fastening unit 210 to obtain the fastening between the electronic apparatus 100 and the external speaker 200. However, this should not be construed as limiting, and as described above, the external speaker 200 may insert the fastening unit 210 into the mount unit 110 of the electronic apparatus 100 in a bayonet manner to fasten to the electronic apparatus 100.

In this case, at least two protrusions may be formed in the outer circumferential surface of the fastening unit 210 of the external speaker 200, and protrusion grooves may be formed in locations of the outer circumferential surface of the mount unit 110 corresponding to the protrusions formed in the outer circumferential surface of the fastening unit 210 of the external speaker 200. Therefore, when the external speaker 200 is rotated to one direction in a state in which the at least two protrusions formed in the fastening unit 210 of the external speaker 200 are inserted into the protrusion grooves formed in the mount unit 110, the protrusions inserted into the protrusion grooves may be fixed to fixing grooves formed in the inner surface of the mount unit 110. When the at least two protrusions formed in the fastening unit 210 of the external speaker 200 are fixed to the fixing grooves formed in the inner surface of the mount unit 110, connection between the connection terminals of the first and second interface units 111 and 211 formed in the inner surfaces of the mount unit 110 and the fastening unit 210 is obtained. Therefore, the electronic apparatus 100 may supply power to the external speaker 200 to perform data communication related to audio output between the electronic apparatus 100 and the external speaker 200.

Figure 4:
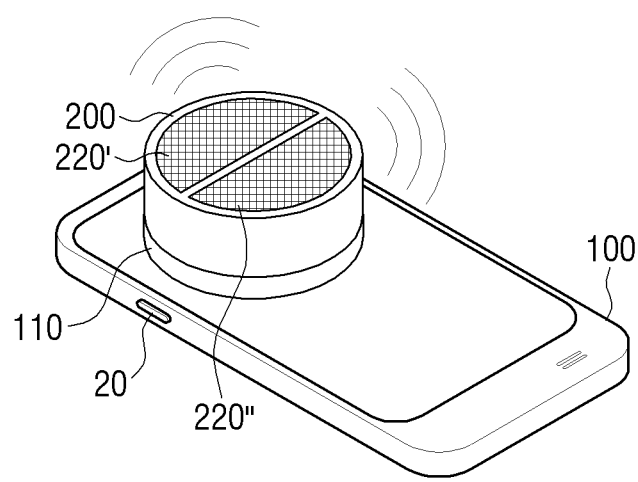
FIG. 4 is an illustrative view illustrating audio output through an external speaker fastened to an electronic apparatus according to an exemplary embodiment.

FIG. 4 is an illustrative view illustrating audio output through the external speaker 200 fastened to the electronic apparatus 100 according to an exemplary embodiment.

As illustrated in FIG. 4, the electronic apparatus 100 may receive a user command for audio output to the external speaker 200 in a state in which fastening between the electronic apparatus 100 and the external speaker 200 is obtained through coupling between the mount unit 110 and the fastening unit 210. When the user command is received, the electronic apparatus 100 transmits an audio signal related to the input user command to the external speaker 200. Therefore, the external speaker 200 may output the audio signal through audio output units 220' and 220" corresponding to first and second audio channels.

In one embodiment, when the user command for the audio output is input to the external speaker 200, the electronic apparatus 100 determines the number of audio channels of the external speaker 200. When it is determined that the external speaker 200 includes two audio channels (that is, the first and second audio channels), the electronic apparatus 100 may perform signal processing so that the audio signal related to the user command is output through the first and second audio channels. Then, the electronic apparatus 100 transmits an audio stream including the audio signal signal-processed to be output through the first and second audio channels and channel information to the external speaker 200 through the first interface unit 111. When the audio stream is received through the second interface unit 211 physically connected to the connection terminals of the first interface unit 111, the external speaker 200 may output the audio signal through the audio output units 220' and 220" corresponding to the first and second audio channels based on the channel information included in the received audio stream.

In another embodiment, when the user command for audio output to the external speaker 200 is received, the electronic apparatus 100 transmits an audio signal related to the user command to the external speaker 200 through the first interface unit 111. When the audio signal is received through the second interface unit 211 physically connected to the connection terminals of the first interface unit 111, the external speaker 200 signal-processes the received audio signal to be output through the first and second audio channels. Therefore, the external speaker 200 may output the audio signals signal-processed according to channels through the audio output units 220' and 220" corresponding to the first and second audio channels.

Figure 5:
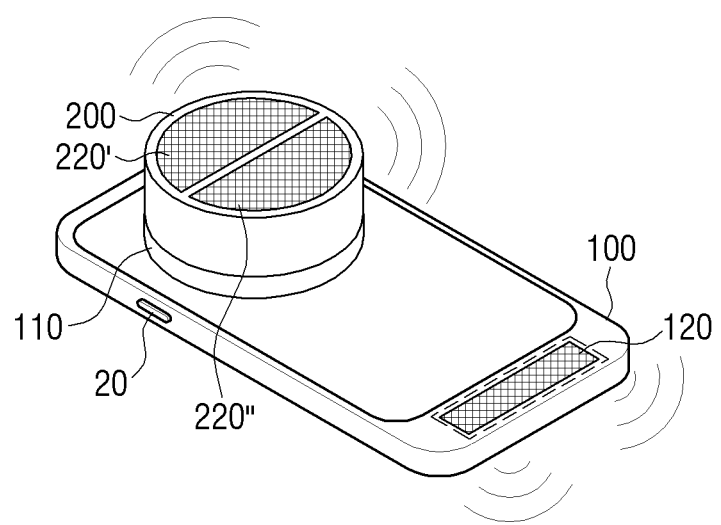
FIG. 5 is an illustrative view illustrating audio output through an external speaker fastened to an electronic apparatus according to another exemplary embodiment.

FIG. 5 is an illustrative view illustrating audio output through an external speaker fastened to the electronic apparatus 100 according to another exemplary embodiment.

As illustrated in FIG. 5, the electronic apparatus 100 may be fastened to the external speaker 200 through the mount unit 110. In the state in which the external speaker 200 is fastened through the mount unit 110, the electronic apparatus 100 may receive a user command for audio output through the external speaker 200 and an internal speaker 120 provided in one surface of the electronic apparatus 100. When the user command is received, the electronic apparatus 100 transmits an audio signal related to the user command to the external speaker 200 through the first interface unit 111. Therefore, the external speaker 200 may output the audio signal, which is received from the electronic apparatus 100 through the second interface unit 211, through the audio output units 220' and 220" corresponding to the first and second audio channels.

The electronic apparatus 100 outputs the corresponding audio signal through the internal speaker 120 at timing synchronized with the corresponding audio signal output through the audio output units 220' and 220" of the external speaker 200.

The audio signal output through the external speaker 200 at timing synchronized in the relation to the audio output of the internal speaker 120 may be signal-processed in a manner to correspond to the first and second audio channels or signal-processed in a manner to correspond to one of the first and second audio channels. When the audio signal is signal-processed in the manner to correspond to the first and second audio channels, the external speaker 200 may output audio signals signal-processed according to channels through the audio output units 220' and 220" at timing synchronized with the corresponding audio signal output through the internal speaker 120.

When the audio signal is signal-processed in the manner to correspond to one of the first and second audio channels, the external speaker 200 may output the audio signal signal-processed to a single channel through the audio output units 220' and 220" at the timing synchronized with the corresponding audio signal output through the internal speaker 120.

The electronic apparatus 100 may be fastened to the external speaker 200 through the mount unit 110 in a state in which the audio signal is output through the internal speaker 120 according to the user command. In the state in which the audio signal is output through the internal speaker 120, when the electronic apparatus 100 is fastened to the external speaker 200, the electronic apparatus 100 interrupts output of the audio signal output through the internal speaker 120, and transmits the corresponding audio signal to the external speaker 200 through the first interface unit 111. When the audio signal is received from the electronic apparatus 100 through the second interface unit 211, the external speaker 200 may output audio signals signal-processed according to the channels through the audio output units 220' and 220" corresponding to the first and second audio channels.

Figure 6:
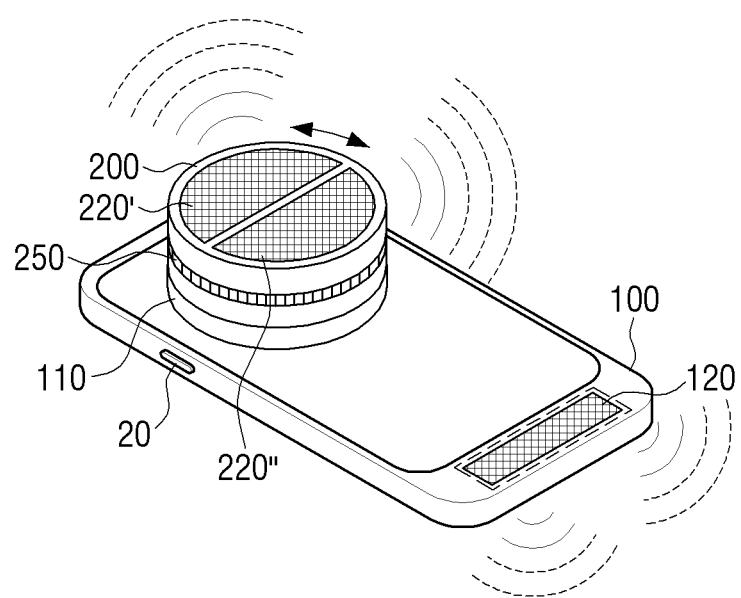
FIG. 6 is an illustrative view illustrating control of audio output of an external speaker fastened to an electronic apparatus according to an exemplary embodiment.

FIG. 6 is an illustrative view illustrating control of audio output of the external speaker 200 fastened to the electronic apparatus 100 according to an exemplary embodiment.

As illustrated in FIG. 6, in a state in which fastening between the electronic apparatus 100 and the external speaker 200 is obtained through coupling between the mount unit 110 and fastening unit 210, the electronic apparatus 100 may receive a user command for audio output to the external speaker 200. When the user command is received, the electronic apparatus 100 transmits an audio signal related to the input user command to the external speaker 200. Therefore, the external speaker 200 may output the audio signal through the audio output units 220' and 220" corresponding to the first and second audio channels.

A jog dial 250 configured to adjust audio output may be formed in the external speaker 200. As illustrated in FIG. 6, the jog dial 250 may be formed on one region of the body of the external speaker 200. Therefore, in a state in which audio signals for channels are output through the audio output units 220' and 220" of the external speaker 200, when an operation command for turning the jog dial 250 to one direction is input from the user, the external speaker 200 controls an output magnitude of the audio signal to be attenuated according to the input operation command. That is, the external speaker 200 may control volumes of the audio signals output according to the channels through the audio output units 220' and 220" to be reduced in response to the operation command of the jog dial 250 input from the user. In contrast, when an operation command for turning the jog dial 250 to the other direction is input from the user, the external speaker 200 may control the volumes of the audio signals output according to the channels through the audio output units 220' and 220" to be increased in response to the input operation command.

In a state in which fastening between the electronic apparatus 100 and the external speaker 200 is obtained through coupling between the mount unit 110 and the fastening unit 210, the electronic apparatus 100 may output audio signals through the internal speaker 120 and the external speaker 200. In the state in which the audio signals are output through the internal speaker 120 and the external speaker 200, when an operation command for turning the jog dial 250 to one direction is input from the user, the external speaker 200 transmits a control signal for the input operation command to the electronic apparatus 100 through the second interface unit 211. When the control signal is received from the external speaker 200 through the first interface unit 111, the electronic apparatus 100 may adjust the volume of the audio signal output through the internal speaker 120 based on the received control signal, and output the adjusted audio signal. The external speaker 200 may adjust volumes of audio signals output according to channels through the audio output units 220' and 220" according to the operation command pre-input at timing synchronized with output of the audio signal adjusted in the electronic apparatus 100, and output the adjusted audio signal.

Thus far, an operation for fastening the external speaker 200 through the mount unit 110 configured to fasten the interchangeable lens 300 and outputting the audio signal through the external speaker 200 fastened to the electronic apparatus 100 has been described in detail through various exemplary embodiments.

Hereinafter, a configuration of the electronic apparatus 100 capable of fastening the interchangeable lens 300 and the external speaker 200 according to an exemplary embodiment will be described in detail.

Figure 7:
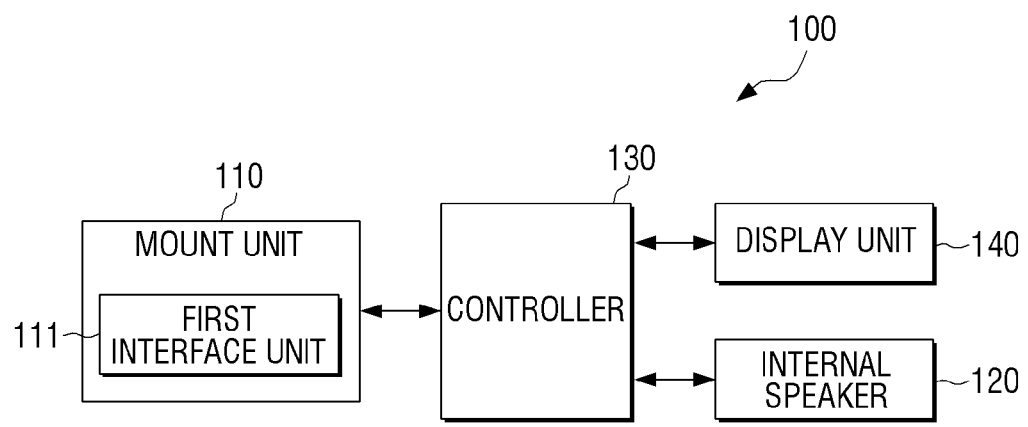
FIG. 7 is a block diagram illustrating an electronic apparatus according to an exemplary embodiment.
Figure 8:
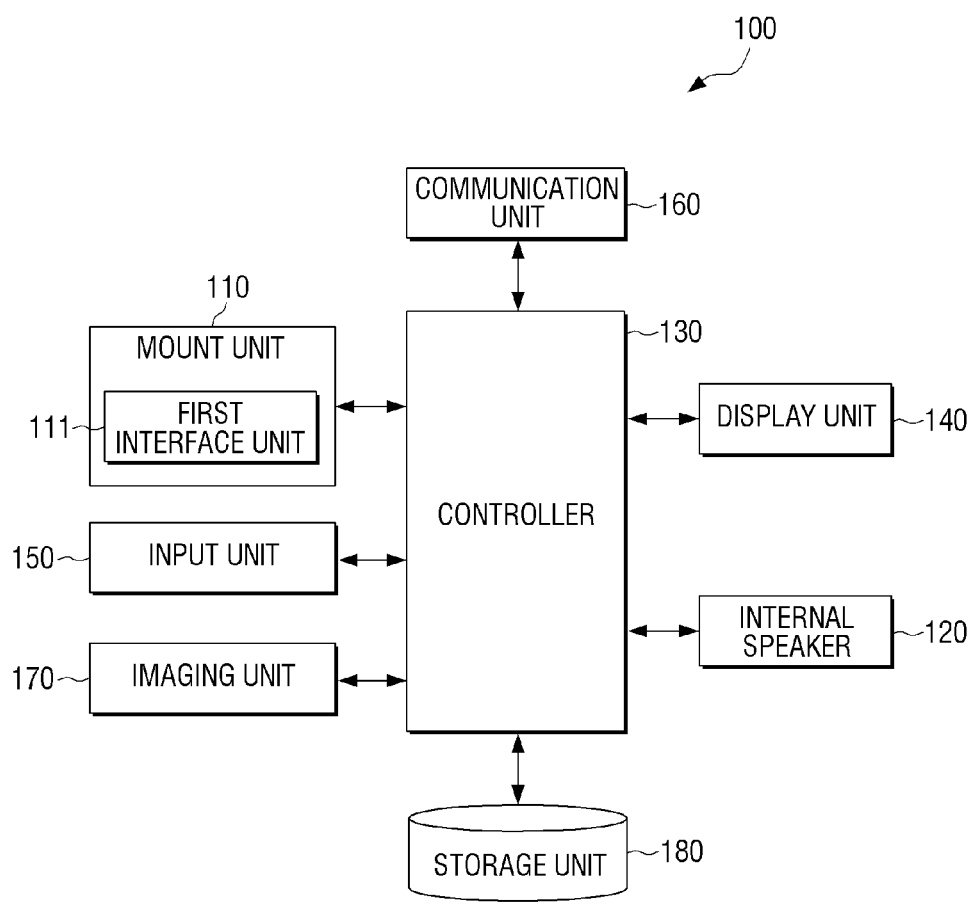
FIG. 8 is a detailed block diagram illustrating an electronic apparatus according to an exemplary embodiment.

FIG. 7 is a block diagram illustrating the electronic apparatus 100 according to an exemplary embodiment, and FIG. 8 is a detailed block diagram illustrating the electronic apparatus 100 according to an exemplary embodiment.

As illustrated in FIGS. 7 and 8, the electronic apparatus 100 includes a mount unit 110, an internal speaker 120, a controller 130, and a display unit 140.

The mount unit 110 performs fastening on one of the interchangeable lens 300 and the external speaker 200. Specifically, the mount unit 110 may be a kind of camera opening structurally configured in such a way that the interchangeable lens 300 is inserted into a body of the electronic apparatus 100. In one embodiment, the mount unit 110 may be formed in a screw type. When the mount unit 110 is the screw type, as illustrated in FIG. 2, a screw thread may be disposed in an inner lateral surface of the mount unit 110, and screw threads configured to be coupled to the screw thread in the inner lateral surface of the mount unit 110 may be disposed in an outer circumferential surface of the lens fastening unit 310 of the interchangeable lens 300 and an outer circumferential surface of the fastening unit 210 of the external speaker 200.

Therefore, when the lens fastening unit 310 of the interchangeable lens 300 or the fastening unit 210 of the external speaker 200 are inserted into the mount unit 110 and rotated to one direction, the interchangeable lens 300 or the external speaker 200 may be fastened to the mount unit 110.

In another embodiment, when the mount unit 110 is a bayonet type, protrusion grooves are formed in locations of the outer circumferential surface of the mount unit 110 corresponding to protrusions formed in the outer circumferential surface of the lens fastening unit 310 of the interchangeable lens 300 or in the outer circumferential surface of the fastening unit 210 of the external speaker 200. Therefore, when the interchangeable lens 300 or the external speaker 200 is rotated to one direction in a state in which at least two protrusions formed in the lens fastening unit 310 of the interchangeable lens 300 or in the fastening unit 210 of the external speaker 200 are inserted into the protrusion grooves formed in the mount unit 110, the protrusions inserted into the protrusion grooves may be fixed to fixing grooves formed in the inner surface of the mount unit 110. Therefore, the mount unit 110 may fasten the interchangeable lens 300 or the external speaker 200.

The mount unit 110 includes a first interface unit 111 configured to perform communication with the interchangeable lens 300 and the external speaker 200. The first interface unit 111 performs data communication with the interchangeable lens 300 or the external speaker 200 fastened through the mount unit 110. That is, connection terminals configured to be connected to connection terminals of the first interface unit 111 and perform data communication may be formed in inner surfaces of the interchangeable lens 300 and the external speaker 200. When the interchangeable lens 300 and the external speaker 200 are fastened to the mount unit 110, the first interface unit 111 may perform data communication with the connection terminals of the interchangeable lens 300 or the external speaker 200 fastened to the mount unit 110. In embodiments, the first interface unit 111 may perform data communication with the connection terminals of the interchangeable lens 300 or the external speaker 200 fastened to the mount unit 110 through serial communication such as serial peripheral interface (SPI) communication or low-power communication such as RS232.

When the interchangeable lens 300 is fastened to the mount unit 110, the controller 130 performs data communication with the interchangeable lens 300 through the first interface unit 111 and controls lens driving of the interchangeable lens 300. When the external speaker 200 is fastened to the mount unit 110, the controller 130 performs data communication with the external speaker 200 through the first interface unit 111 and controls audio output of the external speaker 200.

To this end, the controller 130 determines whether the interchangeable lens 300 or the external speaker 200 is fastened to the mount unit 110. Specifically, when the interchangeable lens 300 and the external speaker 200 are fastened to the electronic apparatus 100 through the mount unit 110, the interchangeable lens 300 and the external speaker 200 transmit identification information to the electronic apparatus 100. Therefore, the controller 130 may determine whether the interchangeable lens 300 or the external speaker 200 is fastened to the mount unit 110 based on the identification information received through the first interface unit 111. The identification information may include resistance values of the interchangeable lens 300 and the external speaker 200. Therefore, when the identification information is received through the first interface unit 111, the controller 130 compares the resistance value included in the received identification information with a reference threshold value pre-stored in a storage unit 180.

As a result of comparison, when the resistance value included in the received identification information is less than the pre-stored reference threshold value, the controller 130 may determine that the external speaker 200 is fastened to the mount unit 110. When the resistance value included in the received identification information is equal to or larger than the pre-stored reference threshold value, the controller 130 may determine that the interchangeable lens 300 is fastened to the mount unit 110. The storage unit 180 configured to store the reference threshold value for determining whether the interchangeable lens 300 or the external speaker 200 is fastened to the mount unit 110 may store an operating system (OS)-related program for controlling an operation of the electronic apparatus 100 and various applications for providing user interfaces.

When it is determined that the interchangeable lens 300 is fastened to the mount unit 110 through comparison of the reference threshold value pre-stored in the storage unit 180 and the resistance value included in the received identification information, the controller 130 controls lens driving of the interchangeable lens 300 through the first interface unit 111. According to the control command, when an optical signal for a subject is incident from the interchangeable lens 300, the controller 130 may control an imaging unit 170 to generate a video image for the optical signal incident from the interchangeable lens 300. Therefore, the imaging unit 170 performs signal processing by converting the optical signal incident from the interchangeable lens 300 into an electrical signal using a CCD image sensor or a CMOS image sensor, and image-processes the signal-processed data to generate the video image. The display unit 140 may display the video image corresponding to the optical signal incident from the interchangeable lens 300 on a screen.

A detailed description of known technology for performing fastening between the mount unit 110 and the interchangeable lens 300 and data communication between the interchangeable lens 300 fastened through the mount unit 110 and the electronic apparatus 100, and displaying the video image for a subject incident through the interchangeable lens 300 on the screen will be omitted.

When it is determined that the external speaker 200 is fastened to the mount unit 110, the controller 130 performs initialization setting for performing data communication with the external speaker 200 through the first interface unit 111, and power supply, and then performs data communication for controlling audio output of the external speaker 200.

When the external speaker 200 is fastened through the mount unit 110 and the initialization setting is completed, the controller 130 controls the display unit 140 to display a UI screen configured to control the audio output of the external speaker 200. According to the control command, the display unit 140 may display the UI screen for controlling the audio output of the external speaker 200. The display unit 140 configured to display the UI screen may include a touch screen configured to input a touch command of a user.

Therefore, in a state in which the UI screen configured to control the audio output of the external speaker 200 is displayed through the display unit 140, the controller 130 may receive the touch command of the user for audio output of the external speaker 200 through the touch screen. However, this should not be construed as limiting, and the controller 130 may receive an operation command of the user for the audio output of the external speaker 200 through an input unit 150 such as a key button.

When the user command according to the touch or operation of the user is input, the controller 130 may transmit an audio signal related to the input user command or a control signal for the audio signal to the external speaker 200 through the first interface unit 111.

In embodiments, in a state in which the UI screen configured to control the audio output of the external speaker 200 is displayed through the display unit 140, the controller 130 may receive a user command including an execution command for content including audio data, and a control command for outputting the audio data of the corresponding content through the external speaker 200. When the user command is received, the controller 130 signal-processes the audio data included in the content related to the input user command to be output through the external speaker 200, and outputs an audio signal for the signal-processed audio data to the external speaker 200 through the first interface unit 111. The external speaker 200 may output the audio signal transmitted from the electronic apparatus 100 through the second interface unit 211.

However, this should not be construed as limiting, and when a user command including an execution command for corresponding content and a control command for the external speaker 200 is received, the controller 130 may transmit audio data included in the content related to the input user command to the external speaker 200 through the first user interface unit 111. When the audio data is received through the second interface unit 211, the external speaker 200 may signal-process the received audio data to be output, and output the signal-processing result.

According to the user command, in a state in which the audio signal is output through the external speaker 200, the controller 130 may receive a user command for adjusting a volume of the external speaker 200 from the user based on the UI screen displayed on a screen through the display unit 140. When the user command is received, the controller 130 generates a control signal corresponding to the input user command, and transmits the control signal to the external speaker 200 through the first interface unit 111. The external speaker 200 may adjust an output intensity of the audio signal according to the control signal received from the electronic apparatus 100 through the second interface unit 211, and output the adjusted audio signal.

In accordance with a further aspect, when a user command for controlling multi audio output is input based on a UI screen displayed through the display unit 140, the controller 130 may control transmission of the first interface unit 111 and audio output of the internal speaker 120 so that audio signals related to the input user command are output through the external speaker 200 and the internal speaker 120. When the audio signals are output through the external speaker 200 and the internal speaker 120 according to the multi audio output command, the audio signal output through the external speaker 200 may be signal-processed to an audio signal to be output through a left (L) speaker, and the audio signal output through the internal speaker 120 may be signal-processed to be output through a right (R) speaker.

Specifically, when the user command for controlling the multi audio output is input, the controller 130 may signal-process audio data included in content related to the user command to the audio signals to be output through the left and right speakers. Next, the controller 130 transmits the audio signal signal-processed to be output through the left speaker to the external speaker 200 through the first interface unit 111, and transmits the audio signal signal-processed to be output through the right speaker to the internal speaker 120.

Therefore, the external speaker 200 may output the audio signal signal-processed to be output through the left speaker, and the internal speaker 120 may output the audio signal signal-processed to be output through the right speaker. That is, when the multi audio output is performed, the external speaker 200 and the internal speaker 120 may function as the left and right speakers to output the audio signals.

In accordance with a further aspect, when the external speaker 200 is fastened to the mount unit 110 in a state in which the audio signal is output through the internal speaker 120, the controller 130 interrupts the audio output of the internal speaker 120. Next, the controller 130 transmits the audio signal of which the audio output in the internal speaker 120 is interrupted to the external speaker 200 through the first interface unit 111. Therefore, the external speaker 200 may output the audio signal received from the electronic apparatus 100.

When the external speaker 200 fastened to the mount unit 110 is detached in a state in which the audio signal is output through the external speaker 200, the controller 130 interrupts transmission of the audio signal to the external speaker 200 through the first interface unit 111. Next, the controller 130 may control the audio signal of which the audio output to the external speaker 200 is interrupted to be output through the internal speaker 120. Therefore, the internal speaker 120 may continuously output the audio signal of the output is interrupted through the external speaker 200.

As described above, the electronic apparatus 100 capable of fastening the interchangeable lens 300 and the external speaker 200 through the mount unit 110 is a terminal apparatus that may photograph an image such as a smart phone or a smart camera, and may further include a communication unit 160 configured to perform wireless communication with an external terminal apparatus (not shown) or a content server (not shown) configured to provide content.

The communication unit 160 may perform communication with at least one of the external terminal apparatus and the content server through a wireless communication module such as a cellular communication module, a wireless local area network (LAN) module, a short-range communication module, a global positioning system (GPS) communication module, or a broadcasting communication module, or a wired communication module such as a high-definition multimedia interface (HDMI), a universal serial bus (USB), or a Institute of Electrical and Electronics Engineers (IEEE) 1394 interface.

The cellular communication module may allow the electronic apparatus 100 to be connected to an external terminal apparatus (not shown) or a content server (not shown) through at least one antenna or a plurality of antennas (not shown) according to a control command of the controller 130 using wireless access technology according to a cellular communication protocol. In particular, when the electronic apparatus 100 is a terminal apparatus such as a smart phone, the cellular communication module may transmit and receive a wireless signal including voice calls, video calls, a short messaging service (SMS) message, or a multimedia messaging service (MMS) message to and from the external terminal apparatus (not shown) having phone numbers input to the electronic apparatus 100.

The wireless LAN module is configured to access a wireless access point (AP) existing in a preset range to be connected to the Internet according to a control command of the controller 130. The wireless LAN module supports a wireless LAN standard (e.g., IEEE 803.11x) of IEEE.

The short-range communication module is configured to wirelessly perform short-range communication between the electronic apparatus 100 and the external terminal apparatus or the content server according to a control command of the controller 130. The short-range communication module may include at least one of a Bluetooth module, an infrared data association (IrDA) module, a near field communication (NFC) module, a WIFI module, and a Zigbee module.

The communication unit 160 may be implemented in the above-described various short-range communication methods. If necessary, the communication unit 160 may employ other communication technologies which are not described in the exemplary embodiment.

Hereinafter, a configuration of the external speaker 200 fastened to the electronic apparatus 100 through the mount unit 110 according to an exemplary embodiment will be described in detail.

Figure 9:
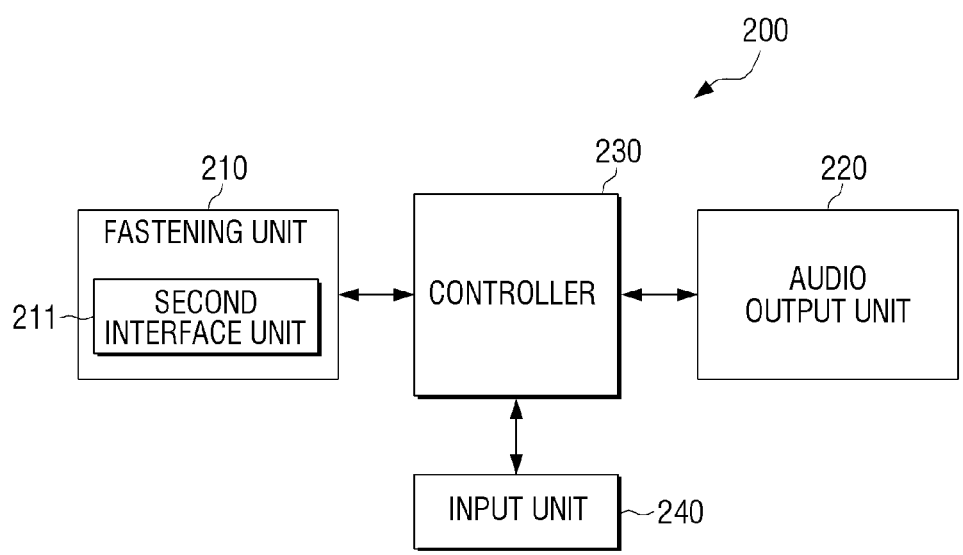
FIG. 9 is a block diagram illustrating a configuration of an external speaker fastened to an electronic apparatus according to an exemplary embodiment.

FIG. 9 is a block diagram illustrating a configuration of the external speaker 200 fastened to the electronic apparatus 100 according to an exemplary embodiment.

As illustrated in FIG. 9, the external speaker 200 includes a fastening unit 210, an audio output unit 220, and a controller 230.

The fastening unit 210 fastens to the mount unit 110 of the electronic apparatus 100 to perform data communication with the electronic apparatus 100. The fastening unit 210 may include a second interface unit 211 configured to perform data communication with the electronic apparatus 100. Specifically, as described in FIGS. 2 and 3, when a screw thread disposed in an outer circumferential surface of the fastening unit 210 is completely coupled to a screw thread disposed in the inner lateral surface of the mount unit 110, connection between connection terminals of the first interface unit 110 formed in the inner surface of the mount unit 110 and connection terminals of the second interface unit 211 formed in the inner surface of the fastening unit 210 may be obtained.

When the connection between the connection terminals formed in the first and second interface units 111 and 211 is obtained, the audio output unit 220 may output an audio signal received through the second interface unit 211 in an audible sound form. The audio output unit 220 may output audio signals through at least two audio channels. The audio signal may be signal-processed to be output through first and second audio channels. Therefore, the audio output unit 220 may output a first audio signal of received audio signals through the first audio channel corresponding to the first audio signal, and output a second audio signal through the second audio channel corresponding to the second audio signal.

When the audio signals are received from the electronic apparatus 100 through the second interface unit 211, the controller 230 controls the audio output unit 220 to output the received audio signals through the at least two audio channels. The controller 230 may control the audio output unit 220 to adjust output of the audio signal based on preset output information and output the adjusted audio signal. The output information may be information for controlling a volume of the audio signal. Therefore, the audio output unit 220 may adjust an output intensity of the audio signal based on the preset output information and output the adjusted audio signal according to a control command of the controller 230.

When a control signal for the audio signal is received from the electronic apparatus 100 through the second interface unit 211 in a state in which the audio signal is output through the audio output unit 220, the controller 230 may control the audio output unit 220 to adjust the output of the audio signal based on the received control signal, and to output the adjusted audio signal.

In embodiments, the control signal received from the electronic apparatus 100 through the second interface unit 211 may a signal for volume control. When the volume control signal is received, the controller 230 adjusts the volume of the audio signal based on the received volume control signal. Therefore, the audio output unit 220 may adjust the output of the audio signal to a magnitude corresponding to the received control signal, and output the adjusted audio signal.

In accordance with a further aspect, the external speaker 200 may further include an input unit 240 configured to receive an adjustment command for audio output through a jog dial or an operation button.

In embodiments, as described with reference to FIG. 6, a jog dial 250 may be formed on one region of the body of the external speaker 200. Therefore, in a state in which the audio signal is output through the audio output unit 220, the user may turn the jog dial 250 to one direction. Therefore, the input unit 240 may receive an operation command corresponding to an operation of the jog dial 250. When the operation command is input through the input unit 240, the controller 230 controls the audio output unit 220 to adjust a volume of an audio signal in response to the input operation command, and to output the adjusted audio signal. Therefore, the audio output unit 220 may adjust the volume of the audio signal to a magnitude corresponding to the operation command, and to output the adjusted audio signal.

When an operation command for turning the jog dial 250 to one direction is input in a state in which the audio signals are output through the internal speaker 120 of the electronic apparatus 100 and the audio output unit 220 of the external speaker 200, the controller 230 may control the audio output unit 220 to adjust the volume of the audio signal in response to the input operation command, and to output the adjusted audio signal. Further, the controller 230 may transmit a control signal corresponding to the preset operation command to the electronic apparatus 100 through the second interface unit 211. Therefore, the audio output unit 220 and the internal speaker 120 of the electronic apparatus 100 may adjust the volumes of the audio signals to a magnitude corresponding to the user's operation of the jog dial 250, and output the adjusted audio signals.

Thus far, the configuration of the external speaker 200 configured to output the audio signal and be fastened to the mount unit 110 of the electronic apparatus 100, which is also configured to fasten to the interchangeable lens 300, has been described in detail.

Hereinafter, a method of controlling the electronic apparatus 100 according to an exemplary embodiment will be described in detail.

Figure 10:
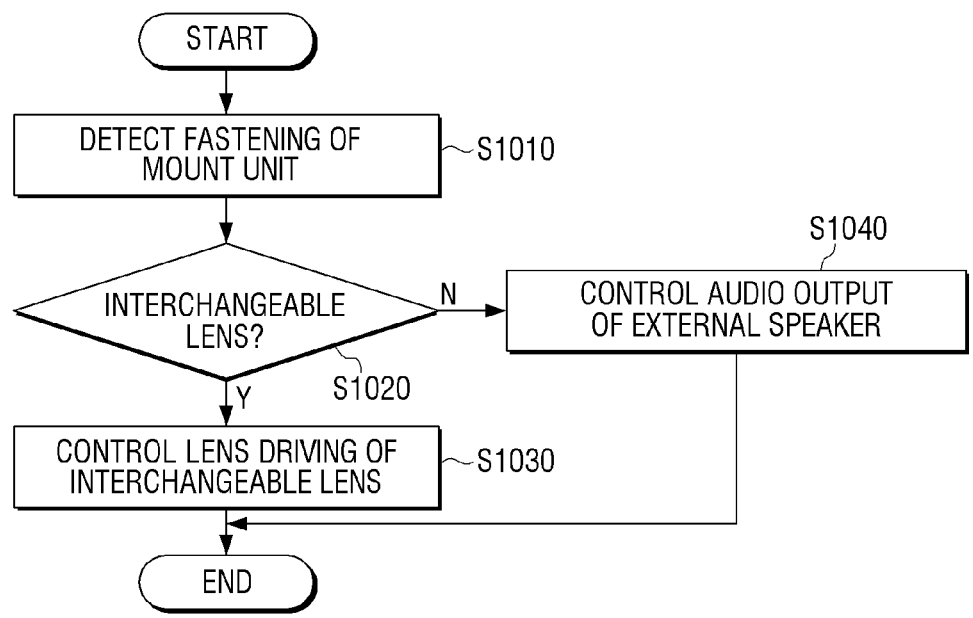
FIG. 10 is a flowchart illustrating a method of controlling an electronic apparatus according to an exemplary embodiment.

FIG. 10 is a flowchart illustrating a method of controlling the electronic apparatus 100 according to an exemplary embodiment.

As illustrated in FIG. 10, the electronic apparatus 100 may fasten the interchangeable lens 300 and the external speaker 200 through a mount unit 110. Therefore, the electronic apparatus 100 detects whether the interchangeable lens 300 or the external speaker 200 is fastened through the mount unit 110 (S1010). When it is detected that the interchangeable lens 300 is fastened to the mount unit 110, the electronic apparatus 100 controls lens driving of the interchangeable lens (S1020 and S1030). When it is determined that the external speaker 200 is fastened to the mount unit 110, the electronic apparatus 100 controls audio output of the external speaker 200 (S1040).

Specifically, when the interchangeable lens 300 and the external speaker 200 are fastened to the electronic apparatus 100 through the mount unit 110, the interchangeable lens 300 and the external speaker 200 transmit identification information to the electronic apparatus 100. The electronic apparatus 100 may detect whether the interchangeable lens 300 or the external speaker 200 is fastened to the mount unit 110 based on the received identification information. The identification information may include resistance values of the interchangeable lens 300 and the external speaker 200. Therefore, the electronic apparatus 100 may compare the resistance value included in the received identification information and a preset reference threshold value. When the resistance value included in the received identification information is equal to or larger than the reference threshold value, the electronic apparatus 100 may determine that the interchangeable lens 300 is fastened to the mount unit 110, and transmit and receive a control signal for lens driving of the interchangeable lens 300 and data through interface communication with the interchangeable lens 300 fastened to the mount unit 110.

When the resistance value included in the received identification information is less than the reference threshold value, the electronic apparatus 100 may determine that the external speaker 200 is fastened to the mount unit 110, and transmit and receive a control signal for controlling audio output of the external speaker 200 and data through interface communication with the external speaker 200 fastened to the mount unit 110.

Figure 11:
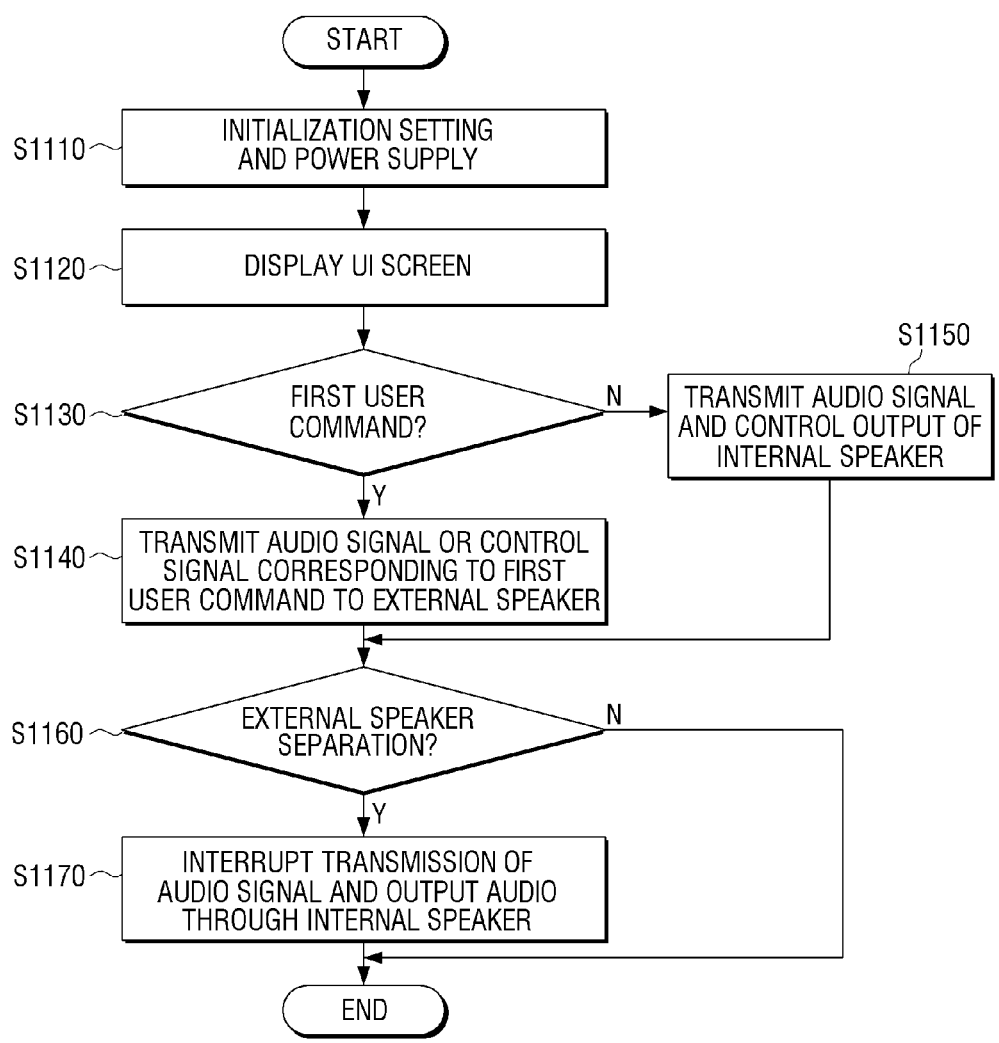
FIG. 11 is a flowchart illustrating a method of controlling an external speaker fastened through a mount unit to an electronic apparatus according to an exemplary embodiment.

FIG. 11 is a flowchart illustrating a method of controlling the external speaker 200 fastened through the mount unit 110 to the electronic apparatus 100 according to an exemplary embodiment.

As illustrated in FIG. 11, when the external speaker 200 is fastened through the mount unit 110, the electronic apparatus 100 performs initialization setting for performing interface communication with the external speaker 200, and supplies power to the external speaker (S1110). Specifically, as described with reference to FIGS. 2 and 3, a first interface unit 111 including a plurality of connection terminals may be formed in an inner surface of the mount unit 110, and a second interface unit 211 including a plurality of connection terminals may be formed in an inner surface of a fastening unit 210 of the external speaker 200 fastened to the mount unit 110. When connection between the pluralities of connection terminals included in the first and second interface units 111 and 211 is obtained according to the fastening of the mount unit 110 and the fastening unit 210, the electronic apparatus 100 may perform the initialization setting for performing data communication with the external speaker 200. Further, the electronic apparatus 100 supplies the power through at least one connection terminal of the plurality of connection terminals included in the first interface unit 111. Therefore, the external speaker 200 may receive the supply of the power through a connection terminal of the second interface unit 211 connected to the connection terminal of the first interface unit 111 for power supply.

When the external speaker 200 is fastened through the mount unit 110 to start data communication, the electronic apparatus 100 generates a UI screen configured to control audio output of the external speaker 200, and displays the UI screen (S1120). When a user command for the audio output of the external speaker 200 is input in a state in which the UI screen is displayed, the electronic apparatus 100 determines whether the input user command is a first user command or a second user command (S1130). The first user command may be a user command for controlling audio output through the external speaker 200, and the second user command may be a user command for controlling audio output through the external speaker 200 and an internal speaker 120 in the electronic apparatus 100. That is, the second user command may be a user command for controlling multi audio output.

When it is determined that the input user command is the first user command, the electronic apparatus 100 transmits an audio signal related to the input first user command or a control signal for the corresponding audio signal to the external speaker 200 through the first interface unit 111 (S1140). Therefore, the external speaker 200 may output the audio signal received through the second interface unit 211 through at least two audio channels or adjust output of the audio signal output through the at least two audio channels based on the control signal and output the adjusted audio signal.

When it is determined that the input user command is the second user command, that is, a user command for controlling multi audio output, the electronic apparatus 100 controls transmission of the first interface unit 111 and audio output of the internal speaker 120 so that an audio signal related to the input second user command is output through the external speaker 200 and the internal speaker 120 (S1150). Therefore, the external speaker 200 may output an audio signal signal-processed to be output through a left speaker, and the internal speaker 120 may output an audio signal signal-processed to be output through a right speaker. That is, when the multi audio output is performed according to the second user command, the external speaker 200 and the internal speaker 120 of the electronic apparatus 100 may function as the left and right speakers to output the audio signals.

However, this should not be construed as limiting, and the electronic apparatus 100 may interrupt the audio output of the internal speaker 120 when the external speaker 200 is fastened through mount unit 110 in a state in which the audio signal is output through the internal speaker 120. Next, the electronic apparatus 100 may transmit the audio signal of the audio output in the external speaker 200 is interrupted to the external speaker 200 through the first interface unit 111. Therefore, the external speaker 200 may output the audio signal received from the electronic apparatus 100.

The electronic apparatus 100 determines whether or not the external speaker 200 fastened to the mount unit 110 is detached in a state in which the audio signal is output through the external speaker 200, or in a state in which the audio signals are output through the external speaker 200 and the internal speaker 120 of the electronic apparatus 100 according to the multi audio output (S1160). When it is determined that the external speaker 200 is detached from the mount unit 110, the electronic apparatus 100 interrupts transmission of the audio signal to the external speaker 200, and outputs the corresponding audio signal through the internal speaker 120 (S1170). Therefore, the electronic apparatus 100 may continuously output the audio signal, which has been output in the external speaker 200, through the internal speaker 120 even when the external speaker 200 which is outputting the audio signal is detached from the mount unit 110.

As described above, when the external speaker 200 is fastened through the mount unit formed on the body of the electronic apparatus 100, the external speaker 200 transmits identification information to the electronic apparatus 100 through a second interface unit 211. Next, when an audio signal is received from the electronic apparatus 100 through the second interface unit 211, the external speaker 200 may adjust output of the audio signal based on preset output information, and output the pre-adjusted audio signal through at least two audio channels. The output information may be information for controlling a volume of the audio signal. Therefore, the external speaker 200 may adjust the volume of the audio signal based on the preset output information, and output the corresponding audio signal to a pre-adjusted volume magnitude through the at least two audio channels.

When a control signal for the audio signal is received from the electronic apparatus 100 through the second interface unit 211 in a state in which the audio signal is output through the at least two audio channels, the external speaker 200 may adjust output of the audio signal based on the received control signal, and output the adjusted audio signal.

In accordance with a further aspect, as described with reference to FIG. 6, when an adjustment command for audio output is input through a jog dial or an operation button, the external speaker 200 may adjust the output of the audio signal according to the input adjustment command, and output the adjusted audio signal.

When an operation command according to an operation of the jog dial is input in a state in which audio signals are output in the internal speaker 120 of the electronic apparatus 100 and the external apparatus 200 according to the multi audio output, the external speaker 200 may adjust a volume of the audio signal in response to the input operation command, and output the adjusted audio signal. Further, the external speaker 200 transmits a control signal corresponding to the pre-input operation command to the electronic apparatus 100 through the second interface unit 211. Therefore, the electronic apparatus 100 may adjust the volume of the audio signal to a magnitude corresponding to the operation of the jog dial, and output the audio signal through the internal speaker 120.

So far, the inventive concept has been mainly described on the basis of various exemplary embodiments.

The foregoing exemplary embodiments and advantages are merely exemplary and are not to be construed as limiting the present inventive concept. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. Descriptions of features or aspects within each embodiment should typically be considered as available for other similar features or aspects in other embodiments unless stated otherwise. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a computer-readable media such as non-transitory magnetic storage media (e.g., magnetic tapes, hard disks, floppy disks), non-transitory optical recording media (e.g., CD-ROMs, Digital Versatile Discs (DVDs), etc.), and non-transitory solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. An electronic apparatus comprising:
an internal speaker;
a mount unit configured to fasten at least one accessory selected from the group consisting of an interchangeable lens and an external speaker; and
a controller configured to:
control lens driving of the interchangeable lens when the interchangeable lens is fastened to the mount unit, and
control audio output of the external speaker when the external speaker is fastened to the mount unit,
wherein the external speaker includes a jog dial to adjust audio output, and the controller adjusts output of an audio signal according to a manipulation direction of the jog dial, and
wherein when a user command for controlling multi audio output is input, the controller controls the external speaker and the internal speaker to output an audio signal related to the user command.

2. The electronic apparatus as claimed in claim 1, wherein:
the mount unit includes a first interface unit configured to perform communication with the interchangeable lens and the external speaker, and
the controller determines whether the interchangeable lens or the external speaker is fastened to the mount unit based on identification information received through the first interface unit.

3. The electronic apparatus as claimed in claim 2, wherein the controller controls:
initialization setting for performing communication with the external speaker, and
supply power to the external speaker when the external speaker is fastened to the mount unit.

4. The electronic apparatus as claimed in claim 3, further comprising a display unit,
wherein the controller controls the display unit to display a user interface (UI) screen configured to control the audio output of the external speaker when the external speaker is fastened to the mount unit.

5. The electronic apparatus as claimed in claim 4, wherein the controller transmits an audio signal related to a user command or a control signal for the audio signal to the external speaker through the first interface unit when the user command for the audio output of the external speaker is input based on the UI screen.

6. The electronic apparatus as claimed in claim 4, further comprising an internal speaker,
wherein the controller interrupts audio output of the internal speaker, and transmits an audio signal through the first interface unit so that the audio signal is output from the external speaker when the external speaker is fastened to the mount unit in a state in which the audio signal is output through the internal speaker.

7. The electronic apparatus as claimed in claim 6, wherein the controller interrupts transmission of the audio signal to the external speaker, and controls the audio signal to be output through the internal speaker when the external speaker fastened to the mount unit is detached in a state in which the audio signal is output through the external speaker.

8. The electronic apparatus as claimed in claim 7, wherein the external speaker includes:
a fastening unit configured to fasten to the mount unit and include a second interface unit configured to perform communication with the electronic apparatus; and
a controller configured to adjust output of a received audio signal based on preset output information when the audio signal is received from the electronic apparatus through the second interface unit, and control the audio output unit to adjust the output of the audio signal based on a received control signal and to output the adjusted audio signal when the control signal for the audio signal is received,
wherein the external speaker outputs the audio signal through at least two audio channels.

9. The electronic apparatus as claimed in claim 8, further comprising an input unit configured to receive an adjustment command for audio output through the jog dial or an operation button.

10. A method of controlling an electronic apparatus, the method comprising:
detecting fastening of a mount unit;
controlling lens driving of an interchangeable lens when the interchangeable lens is fastened to the mount unit;
controlling the output of an internal speaker;
controlling audio output of an external speaker when the external speaker is fastened to the mount unit,
adjusting output of an audio signal according to a manipulation direction of a jog dial included in the external speaker, wherein when a user command for controlling multi audio output is input, controlling the external speaker and the internal speaker to output an audio signal related to the user command.

11. The method as claimed in claim 10, wherein the detecting includes detecting whether the interchangeable lens or the external speaker is fastened to the mount unit through identification information received through a first interface unit of the mount unit.

12. The method as claimed in claim 11, wherein the controlling audio output includes:
controlling initialization setting for performing communication with the external speaker, and
supplying power to the external speaker when the external speaker is fastened to the mount unit.

13. The method as claimed in claim 12, wherein the controlling audio output further includes displaying a user interface (UI) screen configured to control the audio output of the external speaker when the external speaker is fastened to the mount unit.

14. The method as claimed in claim 13, wherein the controlling audio output further includes transmitting an audio signal related to a user command or a control signal for the audio signal to the external speaker through the first interface unit when the user command for the audio output of the external speaker is input based on the UI screen.

15. The method as claimed in claim 13, wherein the controlling audio output further includes interrupting audio output of the internal speaker and transmitting an audio signal through the first interface unit so that the audio signal is output from the external speaker when the external speaker is fastened to the mount unit in a state in which the audio signal is output through the internal speaker.

16. The method as claimed in claim 14, wherein the controlling audio output further includes interrupting transmission of the audio signal to the external speaker and controlling the audio signal to be output through the internal speaker when the external speaker fastened to the mount unit is detached in a state in which the audio signal is output through the external speaker.

17. The method as claimed in claim 16, wherein the external speaker transmits the identification information to the electronic apparatus when the external speaker is fastened to the mount unit, adjusts output of a received audio signal based on preset output information and outputs the adjusted audio signal through at least two audio channels when the audio signal is received from the electronic apparatus, and adjusts the output of the audio signal based on a received control signal and outputs the adjusted audio signal when the control signal for the audio signal is received.

* * * * *